United States Patent Office 3,176,814
Patented Apr. 6, 1965

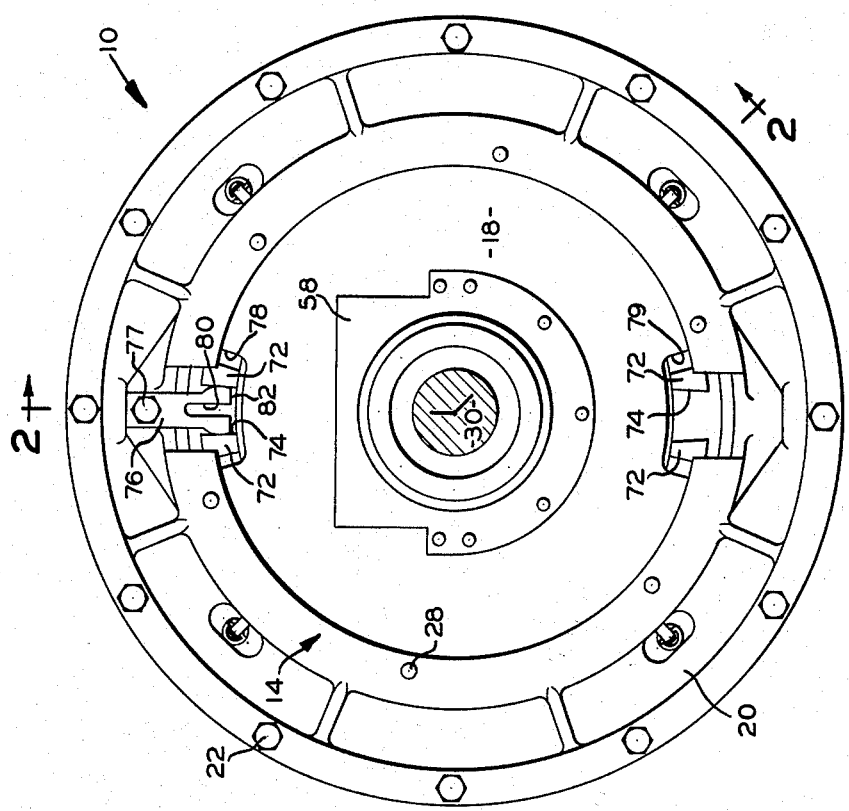
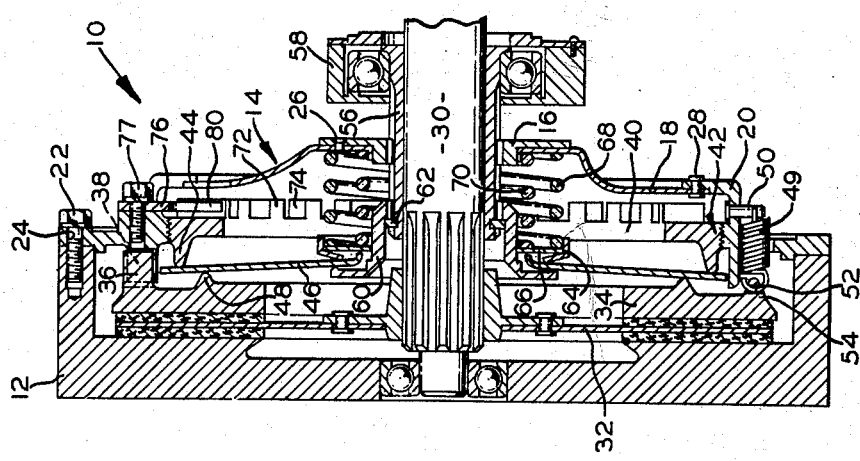

3,176,814
RESILIENT LOCK FOR CLUTCH ADJUSTING DEVICE
William H. Sink, Toledo, Ohio, assignor to Dana Corporation, Toledo, Ohio, a corporation of Virginia
Filed Oct. 1, 1962, Ser. No. 227,338
7 Claims. (Cl. 192—111)

This invention relates to clutch adjusting devices in general and more specifically to a clutch adjusting device including a resilient locking means for securing the adjustment of the clutch.

Clutches of the type having a plurality of levers, actuated by linkage and operative to cause axial movement of a pressure plate means to engage and disengage the clutch, are well known in the art. In one such type of clutch, the levers are pivoted on pivot points carried by an adjusting ring, which ring is threadedly carried by a clutch cover so that upon the ring being rotated relative to said cover, the ring and the pivot points are moved axially relative to the clutch cover and levers. This axial movement of the pivot points allows for adjustment of the levers so that wear and loss of spring biasing effect can be compensated for.

The prior art discloses means for securing adjustment of the adjusting ring relative to the member carrying the same so that the pivot points will not be inadvertently moved during service. Examples of these prior art locking means take the form of springs biasing axially upon the adjusting ring or radially extending bar means secured to the member carrying the adjusting ring and engaging projections upon the adjusting ring. However, it has been noted that there is a great tendency for the adjusting ring to move circumferentially due to operating conditions such as torsional vibrations and that such circumferential movement is not properly resisted by such axially acting springs. Additionally, the radially extending bar means soon "pounds-out" the projections on the adjusting ring damaging the same so that the adjustment is lost and wear of the threaded engagement and of the levers result.

It is, therefore, an object of this invention to provide a clutch lever pivot point adjusting device including an adjusting ring and a locking means which resists circumferential movement of the adjusting ring.

It is another object of this invention to provide such a locking means which acts in a resilient manner so that "pounding-out" of portions of the clutch due to movement of the adjusting ring does not occur.

It is yet another object of this invention to provide a clutch having a lever operated pressure plate, the levers pivotally engaging an adjustable pivot ring and including a resilient locking means for resisting movement of the adjusting ring.

Further and other objects of this invention will become apparent upon a consideration of the following specification when taken in conjunction with the drawings wherein:

FIG. 1 is a plan view of a clutch embodying this invention; and

FIG. 2 is a sectional view taken along the line 2—2 of FIG. 1.

Referring to the drawings, a spring loaded clutch shown generally at 10 is drivingly connected for unitary rotation to a flywheel 12. More particularly, a three piece clutch cover 14, including a central internally splined annular portion 16, an intermediate portion 18, and an outer flanged portion 20, is secured to the flywheel 12 by means of a plurality of bolts 22 passing through circumferentially spaced openings 24 adjacent the periphery of the flange 20 and threadedly secured in the flywheel. The cover portions 16 and 18 are interconnected by means of a plurality of circumferentially spaced rivets 26 and the portions 18 and 20 are interconnected by means of a plurality of circumferentially spaced rivets 28.

An output shaft shown fragmentarily at 30, adapted to be clutched into a driving relationship with the flywheel 12, is piloted at its forward end in the flywheel and extends axially rearwardly therefrom through and radially spaced from the central annular portion 16 of the cover 14. A driven member 32 is splined for unitary rotation and relative axial movement on the forward end of the shaft 30 and is adapted to be pressed into a driving relationship with the flywheel 12 by an axially movable pressure plate 34. The pressure plate 34 is drivingly connected to the cover 14 by means of a plurality of lugs 36 extending axially from the rear surface thereof into registering slots 38 formed in the annular flange portion 20 of the cover 14.

An adjusting ring 40 is peripherally connected to the flange portion 20 of the cover 14 by the threaded engagement shown generally at 42 so that circumferential movement of the ring 40 relative to the cover 14 results in axial movement of the ring relative to the cover and other portions of the clutch 10. An annular shoulder 44 extends axially forward from the adjusting ring 40 adjacent the periphery thereof. A plurality of radially extending clutch lever 46 pivotally engage the shoulder 44 and also engage an annular shoulder 48 formed on the rear face of the pressure plate 34 co-axially with the shoulder 44 and spaced radially inwardly therefrom. In this manner, forward movement of the inner end of the levers 46 pivots the lever on the shoulder 44 and presses the levers on the shoulder 48 thereby urging the pressure plate 34 forwardly to press the driven member 32 into engagement with the flywheel 12. Rearward movement of the levers 46 allows a plurality of return springs 49 to bias the pressure plate rearwardly away from the driven member. One end of each of the return springs 49 is suitably secured to one of a plurality of shouldered pins 50 pressed through the cover 14 and extending radially therefrom. The other end of each of the return springs 49 engages an opening 52 formed in one of a plurality of bosses 54 extending axially from the rear face of the pressure plate 34.

Means is provided to urge the inner ends of the clutch levers 46 axially. More particularly, a hollow release sleeve 56 is rotatably mounted on the output shaft 30 for axial movement relative thereto. A throw-out bearing 58 is secured to the sleeve 56 and is energized by a suitable linkage (not shown) to induce axial movement to the sleeve in a well known manner. The release sleeve 56 is splined for axial movement in the central portion 16 of the cover 14 and has splined to its inner end a flanged lever retaining sleeve 60 which is secured against axial movement relative thereto by an annular snap ring 62. The inner end of the levers 46 are disposed between the flanged portion of the sleeve 60 and an annular lever fulcrum ring 64 surrounding the sleeve 60. An annular spring retaining ring 66 surrounds the sleeve 60 and abuts the fulcrum ring 64 and is pressed against the same by a pair of coiled compression springs 68 and 70 compressed between the cover 14 and the spring retaining ring. The springs 68 and 70 urge the inner ends of the clutch levers 46 forwardly thereby biasing the pressure plate 34 toward the flywheel 12. Rearward movement of the release sleeve 56 pulls the inner ends of the levers 46 rearwardly against the bias of the springs 68 and 70, allowing the pressure plate 34 to be moved away from the flywheel 12 by the return springs 49.

The threaded engagement between the adjusting ring 40 and the cover 14, shown generally at 42, is provided so that upon rotation of the adjusting ring relative to the cover, the shoulder 44, upon which the levers 46 pivot, may be moved axially relative to the cover and the other components of the clutch thereby adjusting the throw of the clutch levers so that wear and loss of spring biasing effect may be compensated for.

Means is provided to lockingly secure the position of the adjusting ring 40 relative to the clutch cover 14. More particularly, the rear face of the adjusting ring 40 is provided with a plurality of bosses 72 projecting axially rearwardly therefrom and defining therebetween a plurality of slots 74 substantially equal in width. A rod 76 is secured to the outer flanged portion 20 of the cover 14 by means of a bolt 77 and extends radially inwardly through an opening 78 in the intermediate cover portion 18 so that its inward portion is disposed in the slot 74 between a pair of adjacent bosses 72. The rod 76 is provided with a medially positioned slot 80 extending radially outwardly from its inner end 82, which slot allows the portion of the rod 76 between adjacent bosses 72 to be resiliently circumferentially compressed.

Accordingly, the rod 76 is formed with a circumferential width greater than the width of the slots 74 and the rod is pressed into one of the slots 74 in a preloaded condition. In the preferred embodiment, the sides of the rod 76 within the slot 74 extend arcuately outwardly from the balance of the rod, so that the balance of the rod may be narrower to conserve weight and have the proper resilient characteristics. In this manner the adjusting ring 40 is resiliently secured relative to the cover 14 by the rod 76 and torsional vibratory loads and other loads tending to urge rotation of the adjusting ring relative to the cover are resiliently resisted by the rod. Since the rod 76 is resiliently preloaded, there is no tendency to "pound-out" the bosses 72 thereby damaging the same and losing adjustment.

To adjust the ring 40, the bolt 77 is removed and the rod 76 withdrawn from the slot 78. The adjusting ring 40 is then rotated relative to the cover 14 until a desired new slot 78 is properly positioned. The rod 76 is then compressed in the new slot 78 and securely bolted to the cover 14. A second opening 79 in the cover 14 diametrically opposed to the opening 78 is provided for balance purposes.

While only a single embodiment of this invention has been shown and described it is apparent that many changes can be made in the structure and operation thereof without departing from the scope of this invention as defined by the appended claims.

What is claimed is:

1. In a clutch having a cover member and pivotally mounted pressure plate actuating levers, the combination comprising a ring member adjustably carried by said cover member and adapted to be rotated relative to said cover member to effect adjustment thereof, pivot means on said ring member for cooperation with the pressure plate actuating levers, whereby circumferential rotation of said ring member effects adjustment of the throw of said levers, and engaging means secured to one of said members and resiliently engaging the other of said members and being resiliently deformed upon relative rotation between said members for resiliently resisting relative rotation therebetween.

2. In a clutch having a cover and pressure plate actuating levers mounted for pivotal movement in an axially extending plane, the combination comprising a ring threadedly carried by said cover and adapted to be threadedly rotated relative thereto to effect adjustment of the relative axial position between said ring and said cover and levers, pivot means on said ring for cooperation with said pressure plate actuating levers whereby the rotation of said ring relative to said cover effects adjustment of the throw of said levers, and resilient means secured to said cover and resiliently engaging said ring and being resiliently deformed upon relative rotation of said cover and said ring for resiliently resisting relative rotation therebetween.

3. In a clutch having a cover and pressure plate actuating levers mounted for pivotal movement in an axially extending plane, the combination comprising a ring threadedly carried by said cover and adapted to be threadedly rotated relative thereto to effect adjustment of the relative axial position between said ring and said cover and levers, pivot means on said ring for cooperation with said pressure plate actuating levers whereby the rotation of said ring relative to said cover effects adjustment of the throw of said levers, and resilient means secured to said cover and engaging said ring and being resiliently deformed upon rotation of said ring in opposite circumferential directions relative to said cover for resiliently resisting relative rotation between said cover and said ring.

4. A clutch of the type having a cover and pressure plate actuating levers mounted for pivotal movement in an axially extending plane, a ring threadedly carried by said cover and being coaxial relative thereto, said ring being adapted to threadedly rotate relative to said cover to effect adjustment of the relative axial position between said ring and said cover and levers, pivot means on said ring for cooperation with said pressure plate actuating levers whereby the rotation of said ring relative to said cover effects adjustment of the throw of said levers, characterized in that abutment means extend axially from said adjusting ring, and resilient means is secured to said cover and extends radially therefrom into engagement with said abutment means and is resiliently deformed upon relative rotation between said cover and said ring for resiliently resisting relative rotation between said cover and said ring.

5. A clutch of the type having a cover and pressure plate actuating levers mounted for pivotal movement in an axially extending plane, a ring threadedly carried by said cover and being co-axial relative thereto, said ring being adapted to threadedly rotate relative to said cover to effect adjustment of the relative axial position between said ring and said cover and levers, pivot means on said ring for cooperation with the pressure plate actuating levers whereby the rotation of said ring relative to said cover effects adjustment of the throw of said levers, characterized in that a plurality of abutment means project axially from said ring defining circumferentially displaced spaces therebetween, and resilient means is secured to said cover and extends radially therefrom into a space between adjoining abutment means engaging both of the same and is operative to be deformed upon movement of said ring in opposed circumferential directions relative to said cover for resiliently resisting relative threaded rotation between said cover and said ring.

6. A clutch of the type having a cover and pressure plate actuating levers mounted for pivotal movement in an axially extending plane, a ring threadedly carried by said cover and being coaxial relative thereto, said ring being adapted to be threadedly rotated relative to said cover to effect adjustment of the relative axial position between said ring and said cover and levers, pivot means on said ring for cooperation with the pressure plate actuating levers whereby the rotation of said ring relative to said cover effects adjustment of the throw of said levers, characterized in that a plurality of abutment means project axially from said ring, said abutment means being substantially equally circumferentially displaced thereby defining a plurality of substantially equal sized circumferentially displaced spaces therebetween, and a rod means being secured to said cover and extending radially therefrom into a space between adjoining abutment means and engaging both of the same, said rod means having a radially extending slot therein in the portion of the same disposed between said abutment means whereby said rod will act resiliently to circumferential loads and is operative to be resiliently deformed upon rotation of said ring in opposed circumferential directions relative to said cover for resiliently resisting relative threaded rotation between said cover and said ring.

7. A clutch having elements and being adapted to join a driving and a driven means for unitary rotation comprising in combination, a cover adapted to be secured to said driving means, a driven member rotatable within said cover and adapted to be secured to the driven means for unitary rotation and to be pressed into engagement with the driving means, an annular pressure plate carried by said cover for unitary rotation therewith and axial movement relative thereto and operative to press said driven member into engagement with said driving means, an adjusting ring threadedly carried by said cover and operative to be threadedly rotated relative to said cover to effect axial movement of said adjusting ring relative to said cover and the other elements of said clutch, pivot means on said adjusting ring, a plurality of levers pivotally engaging said pivot means and abuttingly engaging said pressure plate, linkage means operative to pivot said levers on said pivot means thereby urging said pressure plate axially, and means adjustably securing said adjusting ring against rotary movement relative to said cover, said securing means including a pair of circumferentially spaced abutment means projecting axially from said adjusting ring and defining a space therebetween, and a resilient rod removably attached to said cover and extending radially therefrom into the space between said abutment means and engaging both the same, said rod having a greater circumferential width than the width of said space and being provided with a radially extending slot in the portion thereof between said abutment means, whereby said rod is resiliently compressed between said abutment means and resiliently resists circumferential movement of said adjusting ring relative to said cover.

References Cited by the Examiner
UNITED STATES PATENTS 1,361,511  12/20  Worbois _____ 192—11
1,983,885  12/34  Spase _____ 192—111
2,129,361   9/38  Ruesenberg et al. _____ 192—111

FOREIGN PATENTS 526,858  9/40  Great Britain.

DAVID J. WILLIAMOWSKY, *Primary Examiner.*